United States Patent
Huang

(10) Patent No.: US 7,159,903 B2
(45) Date of Patent: Jan. 9, 2007

(54) STEERING MECHANISM FOR POWER CYCLE

(75) Inventor: Shun-Tai Huang, Nantou Hsien (TW)

(73) Assignees: Chen-Chang Huang, Chiayi County (TW); Taiwan An I Co., Ltd., Chiayi County (TW)

( * ) Notice: Subject to any disclaimer, the term of this patent is extended or adjusted under 35 U.S.C. 154(b) by 368 days.

(21) Appl. No.: 10/833,480

(22) Filed: Apr. 27, 2004

(65) Prior Publication Data

US 2004/0262863 A1  Dec. 30, 2004

(30) Foreign Application Priority Data

Jun. 27, 2003  (TW) .............................. 92211836 U

(51) Int. Cl.
  *B62D 1/00* (2006.01)
  *B62D 7/16* (2006.01)
  *B60G 7/00* (2006.01)
(52) U.S. Cl. ............... 280/771; 280/93.502; 280/93.51
(58) Field of Classification Search ................ 280/771, 280/93.502, 93.51
  See application file for complete search history.

(56) References Cited

U.S. PATENT DOCUMENTS

| | | | | |
|---|---|---|---|---|
| 1,915,224 A | * | 6/1933 | Gerken | 280/93.51 |
| 2,911,229 A | * | 11/1959 | Strehlow | 280/638 |
| 2,974,973 A | * | 3/1961 | Muhleck | 280/775 |
| 3,768,825 A | * | 10/1973 | Magnusson | 280/124.109 |
| 5,305,844 A | * | 4/1994 | Ducote | 180/24.01 |
| 6,164,698 A | * | 12/2000 | Gotoh | 280/771 |
| 6,203,038 B1 | * | 3/2001 | Bernhard | 280/93.502 |
| 6,328,125 B1 | * | 12/2001 | Van Den Brink et al. | 180/211 |
| 6,540,243 B1 | * | 4/2003 | Takayanagi et al. | 280/93.51 |
| 2001/0020782 A1 | * | 9/2001 | Fosse et al. | 280/771 |
| 2002/0046896 A1 | * | 4/2002 | Takayanagi et al. | 180/411 |
| 2002/0125709 A1 | * | 9/2002 | Wu | 280/771 |
| 2004/0032120 A1 | * | 2/2004 | Vaisanen et al. | 280/771 |

\* cited by examiner

*Primary Examiner*—Paul N. Dickson
*Assistant Examiner*—Joselynn Y. Sliteris

(57) ABSTRACT

A steering mechanism is mainly comprised of an upper and a lower axle seat, in which the upper axle seat and the lower axle seat are provided for receiving an upper axle and a lower axle respectively. The upper and the lower seats are combined together by pivotally jointing each other with a respective inverted U-shaped and a U-shaped pivot-joint ends, where a universal joint having two ends thereof coupled with the upper and the lower axles is arranged in a space enclosed by the pivot-joint ends, so that a diversion may be made by taking the upper axle as a rotation center irrespective of the forward rake or backward rake of the upper axle seat.

5 Claims, 4 Drawing Sheets

STEERING MECHANISM FOR POWER CYCLE

BACKGROUND OF THE INVENTION

1. Field of the Invention

The present invention relates to a steering mechanism for power cycle that can provide a rider with better precision in control of a steering operation.

2. The Prior Arts

The steering mechanism of an existing power cycle shown in FIG. 1 is structured in a T-connection by coupling a stem 11 with a tap handlebar 12 at the tap of power cycle, in which a joint 13 is formed at the bottom end of the stem 11 and connected to the top end of a front fork 14 of a front wheel so that the front wheel can be rotated in the same direction when the tap handlebar 12 is diverted; and the joint 13 is employed to enable the stem 11 to be raked forwards or backwards for fitting with people in different statures. However, as shown in FIG. 2, such structure is defective in that when the angle of the stem 11 is adjusted and when diversion is desired, the tap handlebar is not turned by taking the stem 11 as a rotation center, instead, it would take the front hub of the front fork 14 as a rotation center and have the tap handlebar 12 swayed in a relatively larger angle to thereby perform a diversion. This is a case of reluctance in steering operation that incurs inconvenience to a power tricycle or quardricycle indiscriminately.

SUMMARY OF THE INVENTION

The primary object of the present invention is to provide a steering mechanism of power cycle that maintains an upper axle as a rotation center for diversion irrespective of the adjustment angle of a tap handlebar to hence enable a user to operate diversion easily and safely.

In order to realize above object, a novel steering mechanism of the present invention is mainly comprised of an upper and a lower axle seat, in which the upper axle seat is prepared for receiving an upper axle of a tap handlebar, while the lower axle seat is prepared for receiving a lower axle, in which the upper and the lower seats are combined together by pivotally jointing each other with an inverted U-shaped and a U-shaped pivot-joint ends, where a universal joint having two ends thereof coupled with the upper and the lower axles is arranged in that pivot-joint space, so that a diversion may be made by taking the upper axle as a rotation center irrespective of the forward rake or backward rake of the upper axle seat.

The merits of the steering mechanism of power cycle of the present invention may be summarized in the following: (1) The steering operation is easy and the diversion style is independent of the position adjustment of the tap handlebar. (2) Unlike a conventional steering mechanism, in which the tap handlebar must be swayed right and left for diversion that would inevitably limit the operating space, the space in the present invention would not be affected. (3) High safety and nimble operation is expectable.

For more detailed information regarding advantages or features of the present invention, at least an example of preferred embodiment will be described below with reference to the annexed drawings.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

Figure 1:
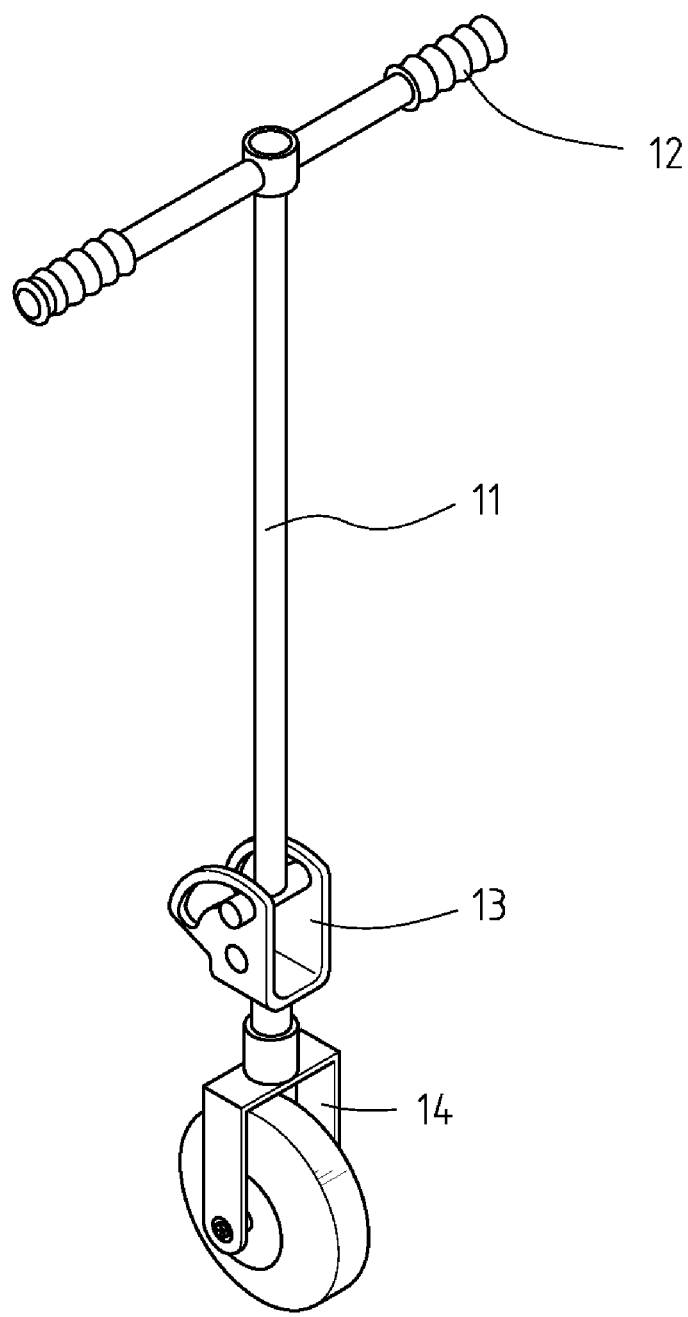
FIG. 1 is a perspective view of a conventional steering mechanism of a power tricycle.
Figure 2:
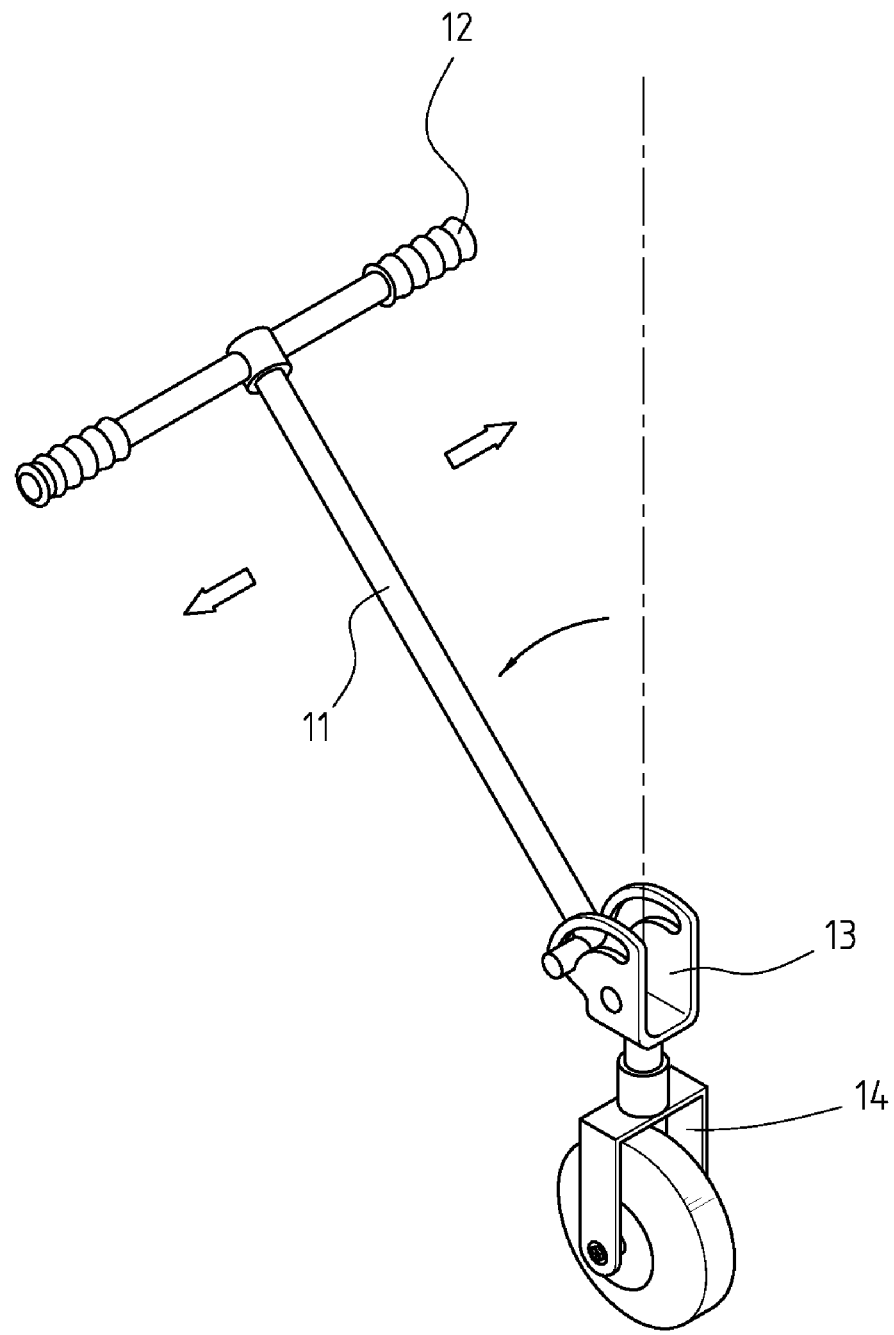
FIG. 2 is a schematic view showing the operation status of a handlebar-regulated conventional power tricycle.
Figure 3:
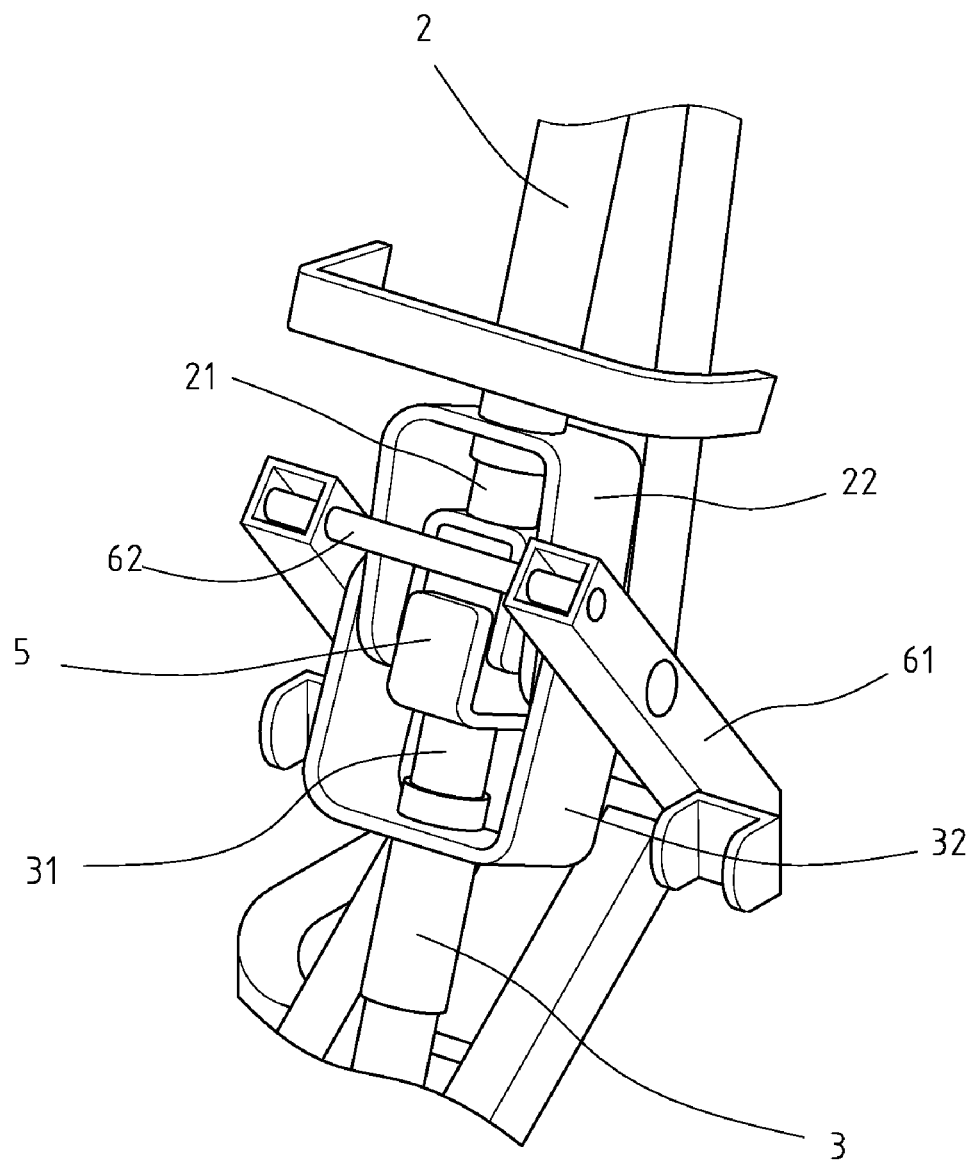
FIG. 3 is a perspective view showing a steering mechanism of power cycle of the present invention.
Figure 4:
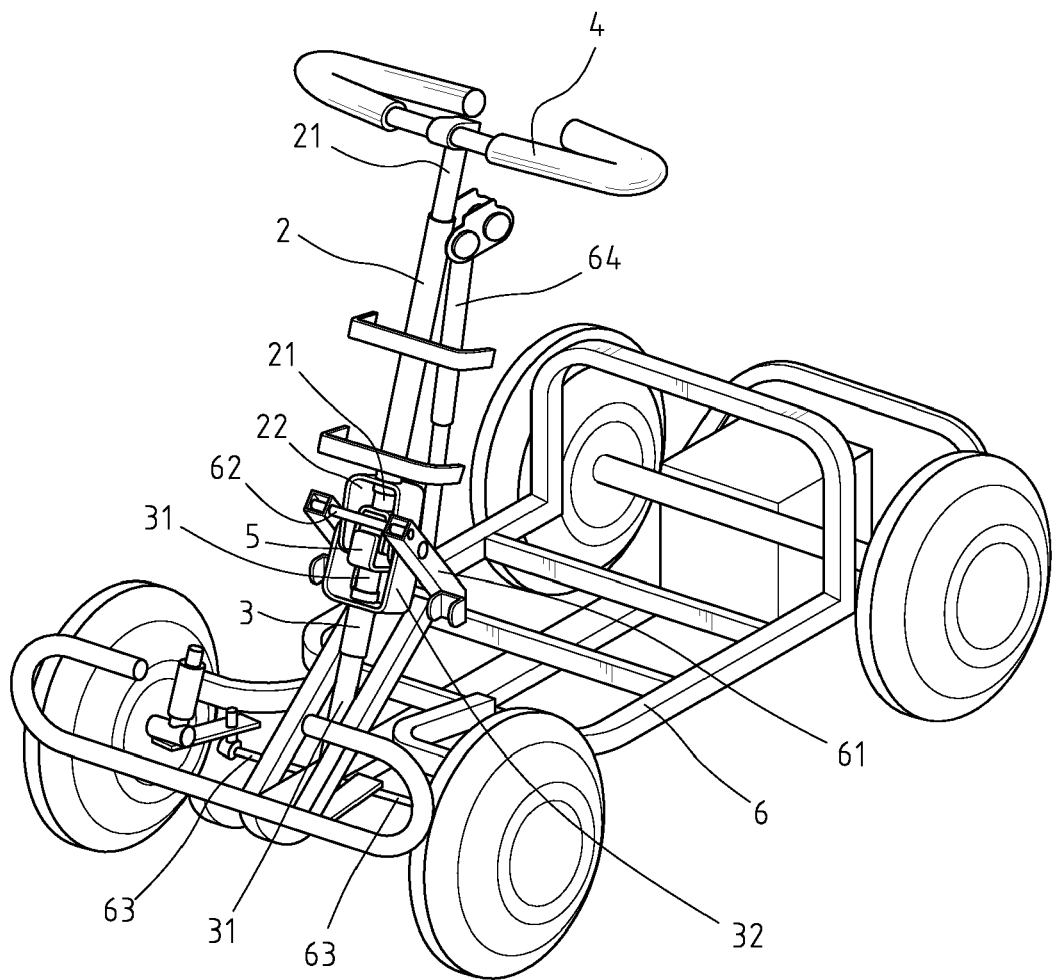
FIG. 4 is a perspective view of the steering mechanism assembled on the frame of the power cycle of the present invention.

With reference to FIGS. 3 and 4, a steering mechanism constructed in accordance with the present invention comprises an upper axle seat 2 and a lower axle seat 3.

The upper axle seat 2 is provided with an upper axle 21 arranged thereon, which is extended upwardly to joint with a tap handlebar 4. The upper axle seat 2 also has an inverted U-shaped pivot-joint end 22 set at the bottom end thereof for pivotally jointing with the lower axle seat 3. The lower axle seat 3 is positioned lower and has a lower axle 31 resided thereon, which is extended downwardly to control the steering action of the front wheels of the roller cycle. The lower axle seat 3 has a U-shaped pivot-joint end 32 on the top end thereof to thus form a relatively larger space between the pivot-joint ends 22, 32, in which there is disposed with a universal joint 5 having two ends combined with the upper and the lower axles 21, 31 respectively so that a user may steer the roller cycle just by turning the tap handlebar 4 to drive the lower axle 31 to turn the same angle and divert the front wheels nimbly to assure safety of a user when the upper axle seat 2 is raked forwards or backwards.

The lower axle seat 3 is directly fixed to two fixing levers 61 extended from a frame 6 through the pivot-joint end 32. In order to prevent an overlarge forward tip angle of the upper axle seat 2, there is a damp lever 62 fixed at a tail end of each fixing lever 61 and transversely stridden across the forwarding tip path of the pivot-joint end 22 of the upper axle seat 2. Moreover, the lower axle 31 is extended downwardly to combine with a diversion transmitting mechanism 63 to facilitate the diversion control of those two front wheels. In order to control the forward and backward rake of the upper axle seat 2, a hydraulic cylinder 64 is mounted on the frame 6 by pivotally jointing two ends thereof with the frame 6 and a top edge of the upper axle seat 2 respectively to thereby adjust the position of the tap handlebar 4 properly. Though the structure stated is applied in a power quardricycle, it can be applied in a tricycle too without limiting the scope thereof.

It is understood from the above that the diversion manner, which is to be made by taking the upper axle 21 as a center, is independent of the position adjustment of the tap handlebar 4 irrespective of the tip angle of the upper axle seat 2, and therefore, safety of using the power cycle of the present invention for people, particularly for old people, can be assured.

In the above described, at least one preferred embodiment has been described in detail with reference to the drawings annexed, and it is apparent that numerous changes or modifications may be made without departing from the true spirit and scope thereof, as set forth in the claims below.

What is claimed is:

1. A steering mechanism for power cycle, comprising:

an upper axle seat having an upper axle coupled with a tap handlebar and a pivot-joint end arranged at a bottom end thereof, which is pivotally jointed with a top end of a lower axle seat;

a lower axle seat having a lower axle disposed thereon for controlling diversion of front wheels; a pivot-joint end connected pivotally with the upper axle seat; and a universal joint disposed in a space enclosed by those two pivot-joint ends for connecting with the upper and the lower axles; and a frame of power cycle for fixing the upper and the lower axle seats thereon;

wherein the upper axle seat has an inverted U-shaped pivot-joint end and the lower axle seat has a U-shaped pivot-joint end, which are pivotally coupled together.

2. A steering mechanism for power cycle, comprising:

an upper axle seat having an upper axle coupled with a tap handlebar and a pivot-joint end arranged at a bottom end thereof, which is pivotally jointed with a top end of a lower axle seat;

a lower axle seat having a lower axle disposed thereon for controlling diversion of front wheels; a pivot-joint end connected pivotally with the upper axle seat; and a universal joint disposed in a space enclosed by those two pivot-joint ends for connecting with the upper and the lower axles; and a frame of power cycle for fixing the upper and the lower axle seats thereon; wherein one end of a hydraulic cylinder is pivotally jointed to one side on the top end of the upper axle seat while the other is fixed to the frame respectively.

3. A steering mechanism for power cycle, comprising:

an upper axle seat having an upper axle coupled with a tap handlebar and a pivot-joint end arranged at a bottom end thereof, which is pivotally jointed with a top end of a lower axle seat;

a lower axle seat having a lower axle disposed thereon for controlling diversion of front wheels; a pivot-joint end connected pivotally with the upper axle seat; and a universal joint disposed in a space enclosed by those two pivot-joint ends for connecting with the upper and the lower axles; and a frame of power cycle for fixing the upper and the lower axle seats thereon;

wherein two fixing levers are extended from the frame and fixed to two sides on the pivot-joint end of the lower axle seat respectively.

4. The steering mechanism according to claim 3, wherein a damp lever is fixed at a tail end of each fixing lever and transversely stridden across a forwarding tip path of the pivot-joint end of the upper axle seat.

5. The steering mechanism according to claim 1, which is applicable to a power quadricycle.

* * * * *